United States Patent [19]

Lyman et al.

[11] Patent Number: 5,429,887
[45] Date of Patent: Jul. 4, 1995

[54] PROCESS FOR TREATING AB5 NICKEL-METAL HYDRIDE BATTERY SCRAP

[75] Inventors: Jane W. Lyman, Salt Lake City; Glenn R. Palmer, Layton, both of Utah

[73] Assignee: The United States of America as represented by the Secretary of the Interior, Washington, D.C.

[21] Appl. No.: 242,900

[22] Filed: May 16, 1994

[51] Int. Cl.$^6$ ............................................. H01M 6/52
[52] U.S. Cl. ..................................... 429/49; 241/14; 423/21.1; 423/49; 423/50; 423/112; 423/122; 423/139; 423/140
[58] Field of Search ..................... 423/21.1, 139, 140, 423/112, 122, 49, 50; 241/14; 429/49

[56] References Cited

U.S. PATENT DOCUMENTS

| | | | |
|---|---|---|---|
| 3,506,550 | 4/1970 | Knapp, Jr. | 429/49 |
| 4,229,508 | 10/1980 | Mussler | 429/49 |
| 4,473,623 | 9/1984 | Ishikura et al. | 429/49 |
| 4,637,928 | 1/1987 | Zajac, Jr. et al. | 429/49 |
| 5,100,745 | 3/1992 | Earl | 429/49 |

Primary Examiner—Wayne Langel
Attorney, Agent, or Firm—E. Philip Koltos

[57] ABSTRACT

A process for treating an AB5 Ni—MH battery to recover purified positive and negative electrode components of the battery is disclosed. An AB5 Ni—MH battery is placed in a mineral acid leach solution to cause the positive and negative electrode components of the battery to separate. The positive and negative electrode components are maintained in the leach solution until the negative electrode component breaks down into its dissolved rare earth metal constituents and metallic solids. The metallic solids remaining from the negative electrode component and the positive electrode components are separated from the mineral acid leach solution and subjected to an elutriation process and thereafter to ball milling to obtain Ni rich powder and Fe. The mineral acid leach solution containing the completely dissolved rare earth metals is subjected to a phosphate precipitation process to recover La and Ce in precipitate, and then subjected to a second precipitation process to recover Ni, Co, Mn and Al.

13 Claims, 1 Drawing Sheet

PROCESS FOR TREATING AB$_5$ NICKEL-METAL HYDRIDE BATTERY SCRAP

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to a process for treating AB$_5$ nickel-metal hydride battery scrap and, more particularly, to a process for recovering purified positive and negative electrode components from such battery scrap for recycling within the battery industry or reuse in a variety of other end-applications.

2. Description of the Prior Art

The world's first rechargeable battery was the lead-acid cell invented by Gaston Plante in 1860. At roughly the turn of the century, alkaline accumulators such as nickel-cadmium (NiCd) and nickel-iron replaced the lead-acid battery as the most commonly used type of rechargeable battery. Although NiCd rechargeable batteries have achieved exceptionally wide acceptance since the 1950's, alternative battery electrode materials are presently urgently being investigated and implemented for a variety of reasons.

First of all, NiCd batteries pose a serious environmental threat due to the problems associated with the disposal of Cd. It is estimated that more than half of the 1,775 tons of Cd in the U.S. municipal waste stream in 1987 came from NiCd batteries which do not pass the EPA's materials toxicity test. In addition, when NiCd batteries are burned with other waste, the resulting ash is so contaminated with Cd that it must be classified hazardous. Although spent batteries represent less than 1% of household waste content, their contribution to the metal feed of a typical incinerator can be higher than 30%. The hazardous material designation means extra work and expense for government and industry and also minimizes available disposal and recycle options for municipalities. Over 30 states have now enacted battery recycling legislation with the intent to limit Cd disposal.

Another reason why NiCd replacement alloys are being actively pursued has to do with the improved electrochemical properties of batteries of alternative design. In nickel-metal hydride (Ni—MH) batteries, for example, a solid-state reaction mechanism is utilized which permits a simple and compact construction resulting in high power density caused by rapid mobility of the hydrogen atom, and effective protection against overcharging and overdischarging. In addition, Ni—MH batteries have no memory effect. NiCd batteries, if not discharged completely before being recharged, can "remember" the partial charge level as the full charge point and often fail to return to full power on the next recharge.

Research on metal hydride alloys began in earnest during the 1970's triggered by the potential use of these materials in heat pumps and as energy carriers. It was found that intermetallic compounds such as LaNi$_5$ and TiFe can absorb large amounts of hydrogen gas and desorb it under ambient pressure at room temperature. Water from an aqueous electrolyte can be reduced electrochemically using these materials while the hydrogen evolved can be stored as a hydride and reoxidized to form water. Consequently, the formation of hydrogen is not an unwanted side reaction but part of the energy storage system.

A great deal of investigation has been carried out on LaNi$_5$ alloys which are commonly referred to by the generic name AB$_5$ due to their stoichiometry. LaNi$_5$ is converted to LaNi$_5$H$_6$ during hydriding. In battery manufacture, LaNi$_5$ is used as the active material of the negative electrode and is converted into LaNi$_5$H$_6$ during the charge. LaNi$_5$ powder has high catalytic activity, a high sorption rate for hydrogen in the lattice, and exhibits favorable electrical conductivity. All in all, LaNi$_5$ has shown to be a promising electrode material for a rechargeable battery except that the storage capacity of LaNi$_5$ can decrease drastically after repeated charging and discharging. Decay in capacity is caused by degradation of the electrode due to the formation of La(OH)$_3$ and can be reduced to acceptable levels by encapsulation of the alloy or by the addition of Co, Si, Al and Zr.

Because of the electrochemical and environmental advantages of Ni—MH batteries over NiCd batteries, it is highly likely that Ni—MH batteries of the AB$_5$ variety will achieve widespread use in consumer and automotive applications. If this is so, recycle technology will be extremely important to both government and industry if the Ni—MH battery is to in fact achieve the extent of use presently envisioned. However, to date no technology is available for effecting the recycling of AB$_5$ Ni—MH batteries.

Consequently, a need exists for a commercially and technologically viable process for treating AB$_5$ Ni—MH batteries to recover purified positive and negative electrode components of the batteries for reuse either within the battery industry or in other industrial end-applications.

SUMMARY OF THE INVENTION

The present invention relates to a process for treating AB$_5$ Ni—MH (nickel-metal hydride) batteries to recover the batteries' purified positive and negative electrode components for recycle or reuse designed to satisfy the aforementioned needs. The process of the present invention takes advantage of the intrinsic behavior differences between the positive and negative AB$_5$ electrode components during hydrometallurgical treatment in order to concentrate certain battery constituents into varied processing streams, thereby minimizing contamination and greatly facilitating further processing of the wastes. In particular, significant Fe (iron) contamination of rare-earth bearing leach solutions is avoided by maintaining the Fe in metallic form.

Accordingly, the present invention is directed to a process for treating an AB$_5$ Ni—MH battery having a positive electrode component formed from an active positive electrode on an Fe or other substrate and a negative electrode component formed from a LaNi$_5$-type powder including Ce and Co on a Ni-mesh substrate to recover purified positive and negative electrode components of the battery. The process comprises the steps of: (a) removing the outer casing of an AB$_5$ Ni—MH battery to be treated to expose the battery's positive and negative electrode components and a nylon separator layer located internal to the battery and operable to electrically separate the positive and negative electrode components; (b) placing the positive and negative electrode components separated by the nylon separator layer in a mineral acid leach solution to cause the positive and negative electrode components to separate from each other and from the nylon separator layer; (c) maintaining the positive and negative electrode components and the inert material layer in the mineral acid leach solution for a first period of time sufficient to allow the LaNi$_5$-type powder of the negative electrode component to separate from its Ni-mesh substrate and at least partially dissolve; (d) subjecting the mineral acid leach solution after the first period of time has expired to filtration to remove the Ni-mesh substrate and the positive electrode component from the mineral acid leach solution containing dissolved LaNi$_5$-type powder and any particulates of undissolved LaNi$_5$-type powder; (e) after step (d) is completed, allowing any undissolved LaNi$_5$-type powder to continue to leach in the leach solution for a second period of time sufficient to completely dissolve the LaNi$_5$-type powder in the leach solution and form a rare earth aqueous leach solution; (f) precipitating the rare earth aqueous leach solution to remove La and Ce therefrom; and (g) subjecting the Ni-mesh substrate and positive electrode component to an elutriation process to separate the Ni-mesh substrate from the positive electrode components.

These and other features and advantages of the present invention will become apparent to those skilled in the art upon a reading of the following detailed description in conjunction with the drawing figure wherein there is illustrated and described a preferred embodiment of the invention.

BRIEF DESCRIPTION OF THE DRAWING

The sole drawing figure is a flow diagram illustrating the process of the present invention for treating an AB$_5$ Ni—MH battery to recover the battery's purified positive and negative electrode battery components.

DETAILED DESCRIPTION OF THE INVENTION

Figure 1:
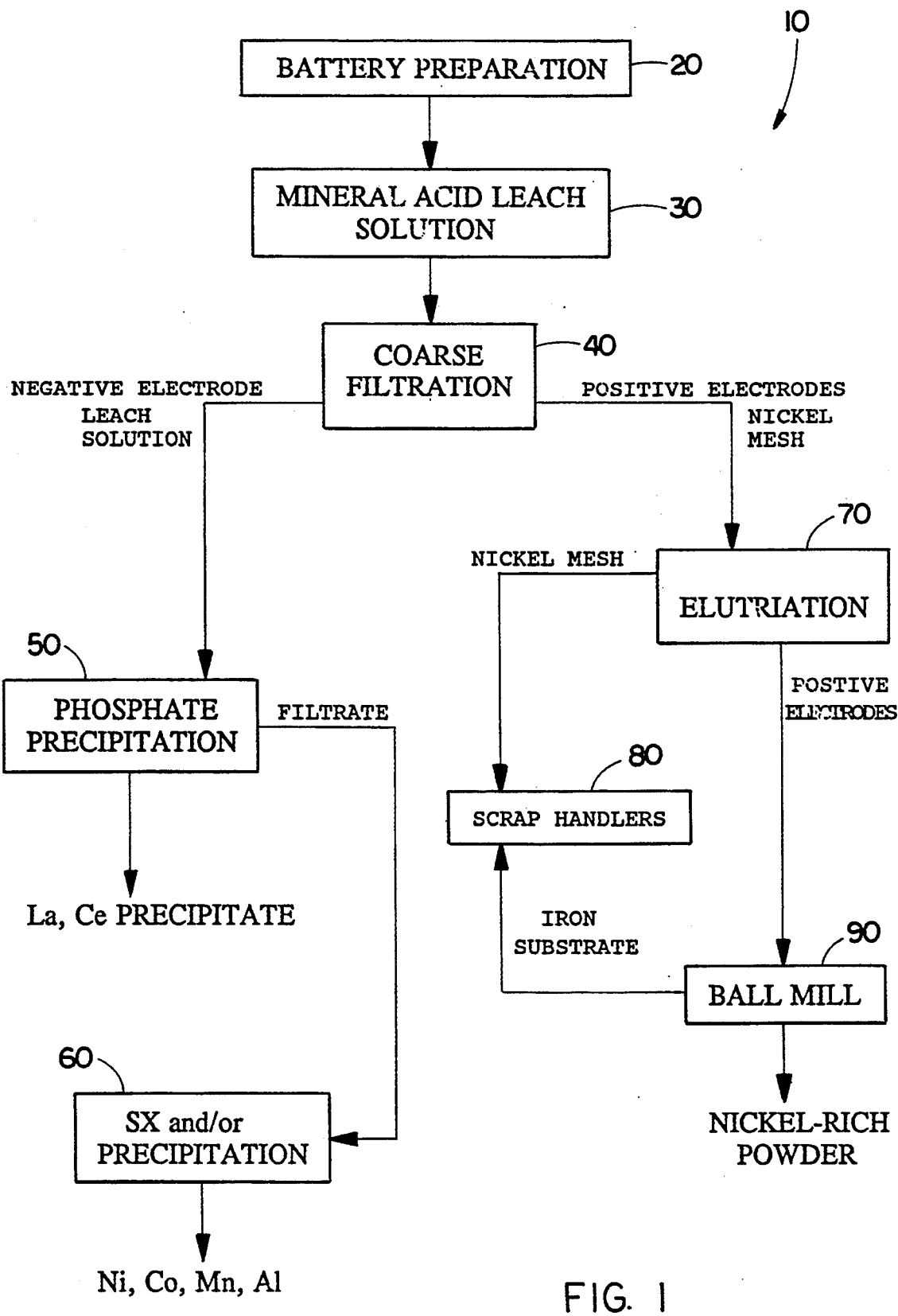

The present invention is directed to a process for treating AB$_5$ Ni—MH battery waste to recover purified positive and negative electrode components of the battery for recycle within the battery industry or reuse in a variety of other end-applications. The process of the present invention takes advantage of the intrinsic behavioral differences between the positive and negative AB$_5$ electrode materials during hydrometallurgical treatment in order to concentrate certain constituents into varied processing streams, thereby minimizing contamination and greatly facilitating further processing of the wastes. In particular, when Fe is used as a substrate material, significant Fe contamination of the rare-earth bearing leach solution utilized in performing the process of the present invention is avoided by maintaining the Fe in metallic form.

By way of background, AB$_5$-type materials are multicomponent, intermetallic compounds based on the prototypical compound LaNi$_5$. "A" elements are predominantly the rare earths while "B" elements are predominantly the transition elements such as Ni and Co. Ni—MH AB$_5$ batteries include a negative electrode component which consists of a LaNi$_5$-type alloy powder sintered onto a Ni-mesh substrate. The LaNi$_5$-type alloy powder will be referred to at various locations herein as "negative electrode powder" for clarity. Typically, the negative electrode powder contains approximately 2.2% Al, 10.0% Ce, 8.5% Co, 0.12% Fe, 15.4% La, 3.3% Mn and 44.8% Ni by weight. Ni—MH AB$_5$ batteries also include a positive electrode component which consists of Ni, Co, and the hydroxides of these metals in powder form pressed onto an Fe foil or other substrate. The Ni, Co and hydroxides of these metals will be referred to herein as the "active positive electrode". The substrate of the positive electrode component accounts for about 8% of the weight of the battery's internal components. The composition of the active positive electrode in powder form is approximately 2.5% Co, 0.05% Fe and 63.9% Ni. The positive and negative electrode components are separated both electrically and physically by an inert, nylon separator layer which permits the transfer of ions between negative and positive electrode components while preventing actual physical contact between such components.

After an AB$_5$-type Ni—MH battery has exceeded its useful life (i.e.—it will no longer accept a satisfactory electrical recharge or is physically damaged), its constituent materials may be recovered and recycled utilizing the process of the present invention as set forth herein. The process for treating AB$_5$ Ni—MH batteries is illustrated in block diagram form in the attached drawing figure and is generally designated by the numeral 10. As will be described herein, the process 10 includes a leaching step to initially separate the battery internals into positive and negative electrode components. To effect satisfactory leaching of AB$_5$ Ni—MH batteries, the preferred process 10 requires that battery components be removed from their outer cases to avoid unnecessary contamination of the leach solution with iron or other impurities. Thus, the first step in the process 10 illustrated in the drawing figure is a battery preparation step designated by the numeral 20. For AB$_5$ Ni—MH consumer batteries, this step 20 may be accomplished by cutting the batteries longitudinally through their positive and negative electrodes to allow access to their internal components. For automotive battery case materials, the preparation step 20 may be accomplished by cutting the battery case as required by physical battery shape in order to liberate the metallic internal components. The actual preferred method for battery cutting or case removal will of course depend upon the configuration required for each individual battery application.

After battery preparation step 20 has been completed and the battery internal components have been exposed, the internal components themselves are subjected to a leaching step 30 which causes the positive and negative electrode components to separate from each other and from the battery's nylon separator layer. It has been found that subjecting between 10 and 100 g of battery scrap to a mineral acid leach solution made from 500 mL of 4M hydrochloric acid (HCl) is sufficient to separate the positive and negative electrode components of the battery from each other and from the nylon separator layer. In particular, it has been found that optimum separation occurs when 90 g of battery scrap are subjected to the 500 mL of HCl. A stronger mineral acid leach solution can actually inhibit the dissolution of the rare-earth constituents of the battery. Sulfuric acid (specifically H$_2$SO$_4$) of a molarity between 1 and 3 has also been found to be an effective leach agent although the amount of Fe in the positive electrode substrate component which tends to dissolve is slightly higher in sulfuric acid than in HCl.

$AB_5$ Ni—MH battery components do not require separation from one another and from the nylon separator layer prior to actually performing leaching step 30 as they all tend to separate spontaneously during the leach. Agitation of the leach solution has also been found to be unnecessary, although gentle stirring helps to liberate the battery components more rapidly. Heating of the leach solution is not advantageous because heating can also increase the amount of Fe extracted from the positive electrode component substrate. This extraction phenomenon is common with heated HCl or $H_2SO_4$ acids. It is recommended that the leaching step 30 be performed at substantially room temperature. Immediately upon introduction into the mineral acid leach solution, the negative electrode powder begins to react with the acid. The nylon separator layer floats to the surface of the bath during the first 10 minutes of leach reaction time and may be removed by skimming the surface of the leach solution using any suitable skimming device. After approximately 20 minutes, the negative electrode powder has been entirely removed from its Ni-mesh substrate which resembles a closely-woven screen. The majority of the negative electrode powder is completely dissolved during this 20 minute residence time in the mineral acid leach solution; however, a small quantity of the negative electrode powder at this point remains in particulate form.

After leach step 30 has been completed, the leach solution is subjected to a coarse filtration step generally designated in the flow diagram by the numeral 40. Coarse filtration of the leach solution allows the leach solution containing the dissolved negative electrode powder and remaining particles of undissolved negative electrode powder to be separated from the negative electrode Ni-mesh substrate, the active positive electrode and the positive electrode substrate. Coarse filtration is performed by filtering the mineral acid leach solution through a sieve with holes on the order of between 2 mm and 3 mm in diameter. After coarse filtration step 40 has been completed, the mineral acid leach solution is allowed to continue to react with the undissolved particles of negative electrode powder until dissolution of the negative electrode powder particles is complete. This total dissolution indicates that all the $LaNi_5$-type powder in the negative electrode component has been dissolved. The time to completely dissolve the negative electrode powder is approximately 2 hours. The resultant mineral acid leach solution after the expiration of 2 hours is concentrated in rare-earth elements La and Ce and contains extremely low amounts of unwanted Fe. A typical leach solution analysis after leaching 92 g of scrap in 4M HCl was, in gram per liter, 19.4 rare earths, 7.9 Co, 0.09 Fe and 50.2 Ni. The "rare earth" leach solution obtained after 2 hours of leaching has been completed may be further treated by subjecting the rare earth leach solution to a precipitation step 50 to remove rare earth salts, La and Ce. Precipitation step 50, which is preferably a phosphate precipitation step, is accomplished in the absence of contaminating Fe as the Fe has been previously removed in solid form during coarse filtration step 40 and the chemistry of the mineral acid leach solution does not cause dissolution of the Fe into liquid form. Remaining Ni, Co, Mn and Al in the leach solution may be removed by any of a number of well-known techniques such as solvent extraction or precipitation techniques. The Ni, Co, Mn, and Al removal phase of the process 10 is designated by the numeral 60.

As previously described, the positive electrode component formed from the active positive electrode and Fe or other substrate, and the Ni-mesh substrate of the negative electrode component are separated from the completely and partially dissolved negative electrode powder in the mineral acid leach solution by performing coarse filtration step 40. In order to recover purified components removed from the leach solution after completion of the filtration step 40, the Ni-mesh substrate and the positive electrode components are washed and thereafter subjected to an elutriation step 70. Elutriation step 70 causes the Ni-mesh substrate to separate from the positive electrode component. Approximately 17.5% of the Ni originally present in the scrap can be recovered as Ni mesh, and the positive electrode component contains 2.7% of the Co and 25.5% of the Ni originally present. Such solid products are suitable for recycle directly to metal scrap handlers 80 or may be subjected to further chemical treatment steps. Alternatively, the positive electrode component may undergo a ball milling step 90 to remove the active positive electrode in powder form which is approximately 85% Ni from its substrate to further scrap handling. The Ni rich powder obtained by ball milling may be reused by battery manufacturers or recycled for other end-applications and the substrate may be passed to metal scrap handlers 80.

As described above, the process 10 is designed to minimize the amount of Fe which is allowed to enter the concentrated rare earth leach solution. In fact, the inventors have determined experimentally that over 99% of the Fe originally present in the battery scrap is retained in solid metallic form and can easily be handled by scrap handlers 80.

It is thought that the present invention and many of its attendant advantages will be understood from the description when taken in conjunction with the drawing figure and it will be apparent that various changes may be made in the form of the invention without departing from the spirit and scope of the invention or sacrificing any of its material advantages, the form hereinbefore described being merely a preferred or exemplary embodiment thereof.

What is claimed is:

1. A process for treating an $AB_5$ Ni—MH battery having a positive electrode component formed from an active positive electrode on an iron substrate and a negative electrode component formed from a $LaNi_5$-type powder including Ce and Co on a Ni-mesh substrate to recover purified positive and negative electrode components of said battery, comprising the steps of:

(a) removing the outer casing of said $AB_5$ Ni—MH battery to expose the battery's positive and negative electrode components and a nylon separator layer operable to electrically and physically separate the positive and negative electrode components;

(b) placing said positive and negative electrode components separated by said nylon separator layer in a mineral acid leach solution to cause said positive and negative electrode components to separate from each other and from said nylon separator layer;

(c) maintaining said positive and negative electrode components and said nylon separator layer in said mineral acid leach solution for a first period of time sufficient to allow the $LaNi_5$-type powder in said negative electrode component to separate from its Ni-mesh substrate and at least partially dissolve;

(d) subjecting said mineral acid leach solution after said first period of time has expired to a filtration process to remove said Ni-mesh substrate and said positive electrode component from said mineral acid leach solution containing dissolved LaNi$_5$-type powder and any particulates of undissolved LaNi$_5$-type powder;

(e) after step (d) is completed, allowing any undissolved LaNi$_5$-type powder to continue to leach in said leach solution for a second period of time sufficient to completely dissolve said LaNi$_5$ powder in said leach solution and form a rare earth leach solution;

(f) precipitating said rare earth leach solution to remove at least La and Ni therefrom; and (g) subjecting said Ce-mesh substrate and positive electrode component to an elutriation process to separate said Ni-mesh substrate from said positive electrode component.

2. The process for treating an AB$_5$ Ni—MH battery as recited in claim 1, including the further step of subjecting said positive electrode component obtained after performing step (g) to a ball milling process to separate the active positive electrode of said positive electrode component from its iron substrate.

3. The process for treating an AB$_5$ Ni—MH battery as recited in claim 1, wherein said mineral acid leach solution is formed from between 1M and 3M H$_2$SO$_4$.

4. The process for treating an AB$_5$ Ni—MH battery as recited in claim 1, wherein said mineral acid leach solution is formed from 4M HCl.

5. The process for treating an AB$_5$ Ni—MH battery as recited in claim 1, wherein said mineral acid leach solution is subjected to gentle agitation as step (b) is being performed.

6. The process for treating an AB$_5$ Ni—MH battery as recited in claim 1, wherein said nylon separator layer referred to in step (b) floats to the top of said leach solution after separation from said positive and negative electrode components and is removed from said leach solution by skimming.

7. The process for treating an AB$_5$ Ni—MH battery as recited in claim 1, wherein step (b) is performed at room temperature.

8. The process for treating an AB$_5$ Ni—MH battery as recited in claim 1, wherein said first period of time is 20 minutes.

9. The process for treating an AB$_5$ Ni—MH battery as recited in claim 1, wherein said second period of time is 2 hours.

10. The process for treating an AB$_5$ Ni—MH battery as recited in claim 1, wherein filtering step (d) is performed by passing said mineral acid leach solution through a sieve having holes therein, each hole being between 2 mm and 3 mm in diameter.

11. The process for treating an AB$_5$ Ni—MH battery as recited in claim 1, wherein precipitating step (f) is performed via a phosphate precipitation process.

12. The process for treating an AB$_5$ Ni—MH battery as recited in claim 1, wherein 10–100 g of Ni—MH battery scrap are treated per each 500 mL of mineral acid leach solution.

13. The process for treating an AB$_5$ Ni—MH battery as recited in claim 12, wherein 90 g of Ni—MH battery scrap are treated per each 500 mL of mineral acid leach solution.

* * * * *